(12) United States Patent
Kortesalmi (10) Patent No.: US 9,868,328 B2
(45) Date of Patent: Jan. 16, 2018

(54) METHOD AND A TRANSFER TRAILER FOR TRANSFERRING A HEAVY TRANSFERABLE WORK MACHINE

(71) Applicant: SLEIPNER FINLAND OY, Jyvaskyla (FI)

(72) Inventor: Ossi Kortesalmi, Jyvaskyla (FI)

(73) Assignee: SLEIPNER FINLAND OY, Jyvaskyla (FI)

( * ) Notice: Subject to any disclaimer, the term of this patent is extended or adjusted under 35 U.S.C. 154(b) by 0 days.

(21) Appl. No.: 14/909,621

(22) PCT Filed: Aug. 13, 2014

(86) PCT No.: PCT/FI2014/050623
§ 371 (c)(1),
(2) Date: Feb. 2, 2016

(87) PCT Pub. No.: WO2015/025077
PCT Pub. Date: Feb. 26, 2015

(65) Prior Publication Data
US 2016/0176252 A1    Jun. 23, 2016

(30) Foreign Application Priority Data
Aug. 20, 2013    (FI) .................................... 20135843

(51) Int. Cl.
*B60P 1/04*    (2006.01)
*B60D 1/24*    (2006.01)
(Continued)

(52) U.S. Cl.
CPC ................ *B60D 1/242* (2013.01); *B60P 1/04* (2013.01); *B60P 3/06* (2013.01); *B60P 3/064* (2013.01); *B60T 1/14* (2013.01)

(58) Field of Classification Search
CPC .... B62D 53/06; B60P 1/04; B60P 3/06; B60P 3/064; B60D 1/242; B60T 1/14
See application file for complete search history.

(56) References Cited

U.S. PATENT DOCUMENTS 1,116,235 A * 11/1914 Brown ...................... B60T 1/14
                                                              188/5
1,625,226 A *  4/1927 Simmons ................. B60T 1/14
                                                              188/152
(Continued)

FOREIGN PATENT DOCUMENTS

| CN | 2443896 | 8/2001 |
|---|---|---|
| DE | 1555287 | 11/1970 |

(Continued)

OTHER PUBLICATIONS

International Search Report, International Application No. PCT/FI2014/050623, dated Dec. 10, 2014.

(Continued)

*Primary Examiner* — Anne Marie M Boehler
*Assistant Examiner* — Michael R Stabley
(74) *Attorney, Agent, or Firm* — Fildes & Outland, P.C.

(57) ABSTRACT

A method is disclosed for slowing a transfer trailer that is used for transporting heavy work machines on a sloping base, the transfer trailer having a chassis with axles and wheels mounted on the axles. The transfer trailer is towable by a transfer vehicle. The method includes the steps of providing the transfer trailer with a brake mounted on the chassis and an operating device, the brake having a brake surface operable to press directly on the base for continuous dragging against the base, operating the operating device to allow pressure to be applied to the brake surface to press directly on the base for continuous dragging against the base to slow the transfer trailer, and measuring at least one control (Continued)

variable relating to the control of the speed of the transfer trailer during the braking and obtaining measurement data.

20 Claims, 8 Drawing Sheets (51) Int. Cl.
  *B60P 3/06* (2006.01)
  *B60T 1/14* (2006.01)

(56) References Cited

U.S. PATENT DOCUMENTS

| | | | | |
|---|---|---|---|---|
| 2,695,682 | A * | 11/1954 | Ehlinger | B60T 1/14 188/5 |
| 2,775,314 | A | 12/1956 | Hiemstra | |
| 4,015,735 | A | 4/1977 | Berglund et al. | |
| 4,490,089 | A | 12/1984 | Welker | |
| 4,569,422 | A * | 2/1986 | Hoffman | B66C 23/80 188/7 |
| 5,040,815 | A * | 8/1991 | Evans | B62D 53/065 280/425.2 |
| 5,267,749 | A * | 12/1993 | Hughes | B60T 1/14 188/5 |
| 5,673,772 | A * | 10/1997 | Martin | B60T 1/14 188/6 |
| 5,775,868 | A | 7/1998 | Mann | |
| 5,899,496 | A * | 5/1999 | Muraro | E02F 9/085 280/765.1 |
| 6,113,338 | A * | 9/2000 | Smith | B60P 1/43 280/43.24 |
| 6,135,700 | A | 10/2000 | Collins | |
| 6,767,172 | B2 * | 7/2004 | French | B60P 1/43 414/481 |
| 6,829,943 | B2 * | 12/2004 | Weyand | G01G 19/086 340/667 |
| 8,827,047 | B2 * | 9/2014 | Baker | B60T 1/14 188/32 |
| 2003/0044265 | A1 | 3/2003 | French et al. | |
| 2003/0154798 | A1 | 8/2003 | Weyand et al. | |
| 2010/0247264 | A1 * | 9/2010 | Walker, III | B60P 3/079 410/23 |
| 2013/0037355 | A1 * | 2/2013 | Baker | B60T 1/14 188/5 |
| 2014/0212259 | A1 | 7/2014 | Barnes | |

FOREIGN PATENT DOCUMENTS

| | | |
|---|---|---|
| EP | 1 234 739 | 8/2002 |
| FR | 2590530 | 5/1987 |
| GB | 2183559 | 6/1987 |
| JP | S61257348 | 11/1986 |
| JP | H01262238 | 10/1989 |

OTHER PUBLICATIONS

English language abstract for FR 2590530.
English language abstract for CN 2443896.
English language abstract for JP S61257348.
English language abstract for JP H01262238.

* cited by examiner

METHOD AND A TRANSFER TRAILER FOR TRANSFERRING A HEAVY TRANSFERABLE WORK MACHINE

CROSS-REFERENCE TO RELATED APPLICATION

This application claims benefit of priority from International Patent Application No: PCT/FI2014/1050623 filed Aug. 13, 2014, which claims benefit of Finland Patent Application No. 20135843, both of which are incorporated by reference in their entirety.

TECHNICAL FIELD

The present invention relates to a method for slowing a transfer trailer on a sloping base, in which the transfer trailer is intended for transferring heavy transferable work machines, and which transfer trailer is arranged to be towed with the aid of a transfer vehicle. The invention also relates to a transfer trailer for transferring a heavy transferable work machine.

BACKGROUND OF THE INVENTION

The transfer of heavy transferable work machines, such as, for example, work machines in the mining industry, is slow and leads to considerable wear in the chassis structure of the work machine. In addition, the vibration while driving stresses the work machine and its driver. In order to speed up transfers, the transfers of work machines are often performed, for example, as carriage transportation, when it is possible to use considerably higher transfer speeds and the wear of the chassis structure of the work machine during transfers can be avoided.

However, a drawback in carriage transportation is that the transfer of braking energy from the wheel brakes of the carriage is problematic as large amounts of braking energy become heat in the brake devices. This requires the energy to be transferred to the air through a cooler, which is an expensive arrangement to implement. In addition, the continuous use of the brakes requires regular maintenance and a fairly large amount of work in replacing parts. In addition, for reasons of safety transfers made as carriage transportation are generally performed only as transfers on the level. If the brakes of the carriage, or the engine, transmission, or brakes of the transfer vehicle develop a fault, for example, when going downhill, the carriage cannot be braked sufficiently with the aid of only the other device's brakes. Further, a problem with the braking of the carriage is often the limited grip of the tyres, even though the braking power of the carriage would be sufficient.

Also known from the prior art is publication CN 2443896 Y, which discloses an emergency braking mechanism to be installed on the underside of a bus, which presses against the ground in emergency braking. Such a braking mechanism is, however, only suitable for the emergency braking of lighter vehicles, such as buses, which occurs rarely.

SUMMARY OF THE INVENTION

The invention is intended to create a method that is safer and simpler than those of the prior art for slowing a transfer trailer on a sloping base. The method according to present invention is characterized by controllably slowing a transfer trailer that is used for transporting heavy work machines on a sloping base, the transfer trailer having a chassis with axles and wheels mounted on the axles. The transfer trailer is towable by a transfer vehicle. The method includes the steps of providing the transfer trailer with a brake mounted on the chassis and an operating device, the brake having a brake surface operable to press directly on the base for continuous dragging against the base, operating the operating device to allow pressure to be applied to the brake surface to press directly on the base for continuous dragging against the base to slow the transfer trailer, and measuring at least one ontrol variable relating to the control of the speed of the transfer trailer during the braking and obtaining measurement data. The invention is also intended to create a transfer trailer for transferable work machines that is safer and simpler than transfer trailers of the prior art. A transfer trailer according to present invention is characterized by a chassis including a first end and a support surface carried by the chassis for supporting a transferable work machine on the transfer trailer. The transfer trailer includes an axle on the chassis and at least two wheels mounted on the axle, one on each side of the chassis. A brake is mounted on the chassis and an operating device operates the brake for slowing the speed of the transfer trailer on a sloping base. The brake includes a brake surface operable to press directly on the base for continuous dragging against the base, a sensor for measuring a control variable relating to controlling the speed of the transfer trailer, and a control connected to the sensor for controlling the pressing of the brake surface against the base according to the measured control variable.

The intention of the method according to the invention can be achieved by means of a method for slowing a transfer trailer on a sloping base, in which method the slowing of the transfer trailer takes place by pressing, with the aid of an operating device, a brake surface directly against the base, and in which at least one control variable relating to the control of the speed of the transfer trailer is measured during the transfer and on the basis of the measurement data the pressing of the brake surface is guided. The transfer trailer is intended for the transfer of heavy transferable work machines and is arranged to be towed with the aid of a transfer vehicle. By means of the method according to the invention, the great braking power required by a loaded transfer trailer is achieved by using the base as a counter-surface for the braking. By means of the method according to the invention, it is also very safe to implement the transfer, as if a fault develops in the apparatus the transfer trailer will stop by itself due to the friction between the transfer trailer and the ground. In other words, transferring the transfer trailer even on a downhill slope requires, in a preferred embodiment, the tractive force of the transfer vehicle, without which the entire vehicle combination will stop.

The control variable is preferably the transfer speed of the transfer trailer and/or the tractive force between the transfer trailer and the transfer vehicle. The aforementioned control variables can be used to guide the transfer trailer either automatically or manually. Control based on speed and the tractive force between the transfer trailer and the transfer vehicle can be joint cascade control of the speed and tractive force, or some other kind of co-ordination.

In addition to a control variable, the operating variable can be at least one of the following: the load of the transfer trailer, the longitudinal tilting of the transfer trailer, or the location of the work machine in the transfer trailer. Operating variables can be used to control the braking when the transfer trailer is stationary prior to a transfer.

The operating variable is preferably the tractive force between the transfer trailer and the transfer vehicle and the limit value of the tractive force is arranged to be larger than only the traction caused by the weight of the transfer vehicle. Thanks to this, the pressure in the brake surface can be lightened, the tractive force being sufficiently large, thus improving the economy of the transfer, due to the reduced need for tractive energy and wear in the wearing components of the brake surface.

The slowing of the speed of the transfer trailer when transferring preferably takes place entirely with the aid of the brake surface. The transfer trailer can then be manufactured without traditional disc brakes and the transfer can be performed without using the brakes of the transfer vehicle.

The brake surface is preferably pressed continuously directly against the base. This is a safety factor, which prevents an uncontrolled rise in the speed of the transfer trailer, as the transportation of the transfer trailer demands traction in all circumstances and, if it fails, the transfer trailer stops.

According to one embodiment, the pressure of the brake surface is controlled by manual operation with the aid of an indicator of the control variable shown to the operator. As it is manually operated the method is extremely simple.

According to another embodiment, at limit value is set for at least one of the control variables, on the basis of which the operation of the operating device is guided automatically to press the brake surface of the transfer trailer with the aid of the control means. The use of automation increases safety and reduces the risk of human errors in transfers.

Tipping means are preferably operated by the operating device to rotate the chassis of the transfer trailer around the bogie axle to control the strength of the contact between the brake surface and the base in order to reduce the speed of the transfer trailer.

The rotation of the chassis of the transfer trailer around the bogie axle is preferably guided on the basis of tilting the transfer trailer in such a way that the transfer trailer's chassis is tilted towards the horizontal plane. When the transfer trailer is, for example, on a downhill slops transporting a work machine weighing 100 tonnes are a speed of 15 km/h the braking effect is controlled with the aid of control means automatically by rotating the transfer trailer's chassis around the transverse axle.

In the method according to the invention, the weight of the work machine is preferably more than 50 tonnes, most preferably more than 100 tonnes. For such a purpose, the use of conventional brakes located in a wheel would produce a great deal of heat and would be expensive to implement. By means of the transfer trailer according to the invention based on dragging transfers can be implemented without the problems relating to the overheating of wheel brakes, such as brake fade or the danger of fire when they overheat.

It is particularly advantageous to apply the method according to the invention, i.e. for example with work machines to be transferred independently with the aid of wheels or crawler tracks, as these can be moved under their own power over ramps and onto the transfer trailer. The method can also be implemented, for example, with work machines that are lifted onto the transfer trailer with the aid of a separate crane.

The intention of the transfer trailer according to the invention can be achieved by means of a transfer trailer for transferring a heavy work machine, which transfer trailer is arranged to be towed with the aid of a transfer vehicle, which transfer trailer includes a chassis comprising two ends including a towing head at the first end and a support surface carried by the chassis for the work machine to be transported, wheels mounted on axles in the chassis, of which there is at least one wheel on each side of the chassis, and brake means and their operating device for slowing the transfer trailer on a sloping surface. The brake means of the transfer trailer include a brake surface arranged to press directly on the base, a sensor for measuring the control variable arranged for controlling the speed of the transfer trailer, and control means connected to the sensor for controlling the pressing of the brake surface based on the measured control variable. By means of such a solution, the energy arising in braking can be transferred directly to the road surface by dragging, at the same time levelling the road surface.

The transfer trailer preferably includes tipping means for tilting the chassis in order to transfer the work machine on and off the chassis and for pressing the brake surface located at at least one end of the chassis onto the base, in order to brake the transfer trailer during the transfer. The chassis can then be used both for tipping and for slowing the transfer trailer, so that the construction of the chassis can be quite simple.

The operating device for pressing the brake surface preferably includes tipping means for tilting the chassis. By using the same operating device the construction of the transfer trailer remains simple.

The transfer trailer can include coupling means located at the first end of the chassis for coupling the transfer trailer to the transfer vehicle towing it. With the aid of the coupling means, the transfer trailer can be coupled to be towed by the transfer vehicle.

The coupling means can be pivoted with the aid of a transverse pivot to the first end of the chassis. The transverse pivot permits the vertical movement of the transfer trailer relative to the transfer vehicle and thus permits the use of the tipping means at the same time also as part of the brake means, thus simplifying the overall construction of the transfer trailer.

The tipping means can include an operating device between the coupling means and the chassis. This allows the tipping of the transfer trailer to be implemented without a separate sub-chassis.

The coupling means are preferably a gooseneck pivoted with a transverse pivot to the traction end and branching from the centre to both sides. The use of a gooseneck extends the load space available in the middle of the transfer trailer, which is necessary, for example, for the rooter of a bulldozer. In addition, a gooseneck forms a very strong structure, which is sufficiently durable. The term gooseneck refers to a boom according to the figures, the shape of which is curved, preferably in two directions. A gooseneck can also be referred to as a crane-neck arm.

Both ends of the chassis preferably include a brake surface on the undersurface of the chassis. Braking can then be carried out by tipping the chassis of the transfer trailer always towards the horizontal plane when driving downhill or uphill.

According to a second embodiment, the transfer trailer includes a separate arm pivoted to the undersurface of the chassis, to the end of which the brake surface is attached and between which arm and the chassis an operating device is pivoted. Such an embodiment can also be retrofitted to existing carriages, in which case the use of the carriage's own brakes can be given up.

The brake surface can have a quick-release attachment and can be replaced. The brake surface can then be changed according to conditions and also when it becomes worn out.

The control means can be arranged to control the tilting of the chassis automatically to create a braking effect. Thus the operator need not control the tilting of the chassis.

The transfer trailer preferably includes at least two mutually interchangeable brake surfaces, which brake surfaces have different coefficients of friction. By means of such a solution, the brake surface providing a suitable braking effect can be selected for different conditions.

The weight of the work machine to be transferred by means of the transfer trailer according to the invention is, as stated above, preferably more than 50 tonnes, most preferably more than 100 tonnes. For such a purpose, the use of conventional brakes located in connection with a wheel would produce a great deal of heat and would be expensive to implement. By means of the transfer trailer according to the invention and based on dragging, transfers can be implemented without the problems relating to the overheating of brakes.

According to another embodiment, the transfer trailer includes locking means for locking the work machine on top of the chasses, which locking means include fibre-reinforced securing ropes and at least one locking operating device for tightening the securing ropes. It can be ensured that the work machine remains in place on top of the transfer trailer's chassis with the aid of the locking means. In addition, the use of fibre-reinforced securing ropes lightens the overall construction of the transfer trailer and increases the safety of the transfer trailer.

The brake surface preferably has a quick-release attachment. In this way, the brake surface acting as a wearing component can be changed rapidly and easily at regular intervals or according to operating conditions.

The transfer trailer can include a set of bogie wheels. With the aid of the set of bogie wheels, additional load-bearing capacity is achieved and the axle of the set of bogie wheels to the chasses also acts, in a preferred embodiment, as a pivot for the rotation of the chassis during braking. The use of a set of bogie wheels also improves the rough-ground properties of the transfer trailer as the stability and load-bearing capacity of the transfer trailer are improved.

The second end of the chassis of the transfer trailer preferably includes two separate brake surfaces. Thus, the brake surface can be located at the extreme second end of the chassis at the ends of the ramps.

According to one embodiment, crushing-jaw wear components, similar to known jaw crushers are used as the brake surface. These are designed to withstand large wearing forces.

The operation of the method according to the invention and the corresponding transfer-trailer brake means is based on brake means being made in the transfer trailer, by means of which braking takes place directly from the brake surface to the base surface by dragging. This is carried out without brake mechanisms in the hub and without the effect of the grip of the tyre on braking. In this way, the effect of the grip of the tyre on braking can be eliminated. In addition, it is surprising that in the method braking is continuous, so that the transfer of the transfer trailer even downhill requires traction. This, however, brings the safety of the transfer to a new level.

BRIEF DESCRIPTION OF THE DRAWINGS

In the following, the invention is described in detail with reference to the accompanying drawings depicting some embodiments of the invention, in which.

DETAIIED DESCRIPTION OF THE INVENTION

Figure 1:
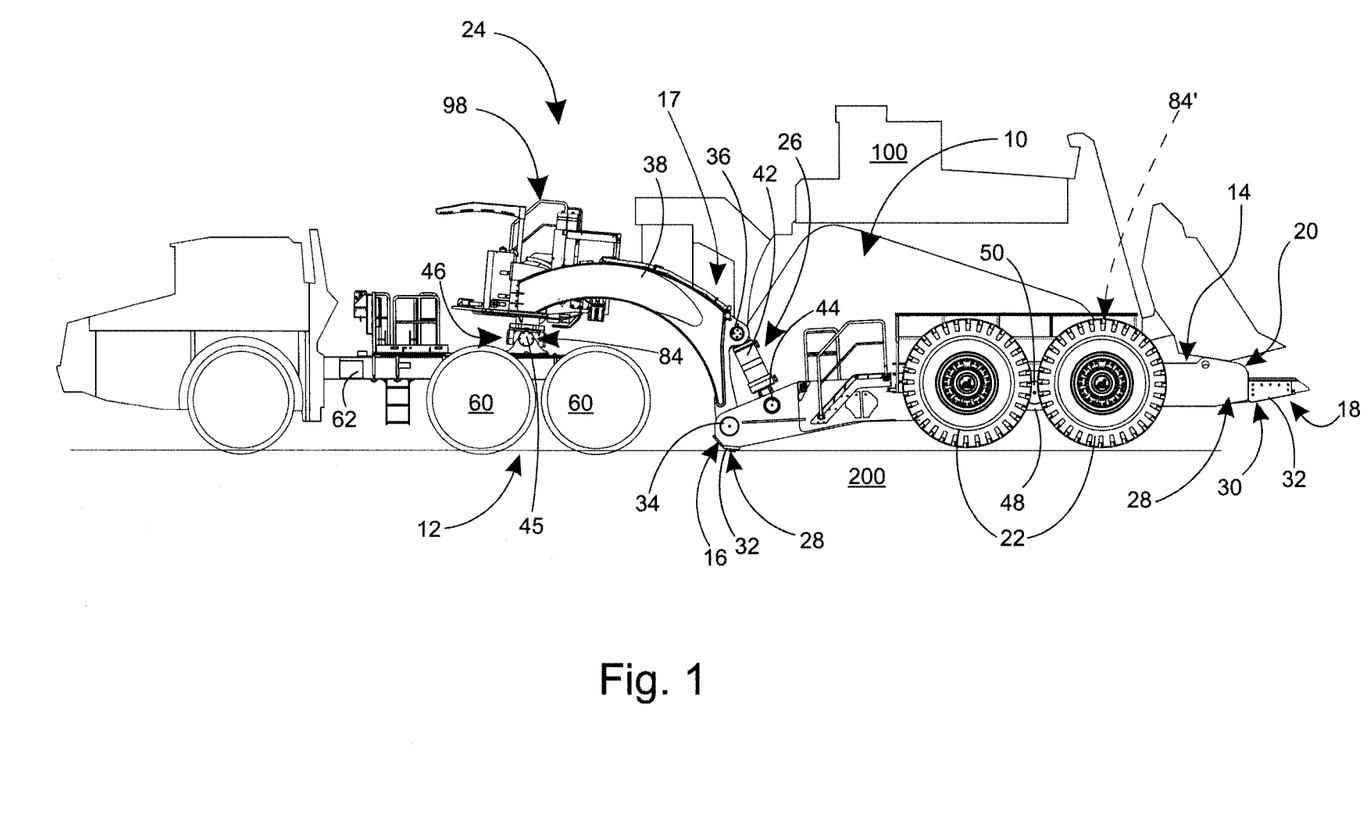
FIG. 1 shows an overall side view of a first embodiment of the transfer trailer according to the invention, when the transfer trailer is being towed by the transfer vehicle with a work machine being carried by the transfer

FIG. 1 shows the transfer trailer 10 according to the invention, which is attached to be towed behind a transfer vehicle 12. The transfer vehicle 12 can be, for example, according to the figure, a mining vehicle, for example a dump truck without a platform. The work machine 100 to be transferred is on the transfer trailer 10, and can be, for example, according to FIG. 1 a bulldozer, an excavator, a drilling machine equipped with crawler tracks or some other similar work machine to be transferred. According to the figure, the transfer trailer 10 includes a chassis 14 comprising two ends 16 and 18 including a towing head 17 at the first end, which chassis 14 forms a support surface 20 for the work machine 100 to be transported. In this connection, the term support surface 20 refers to a surface, on which the work machine 100 is supported with the aid of its crawler tracks. The transfer trailer 10 also includes wheels 22 mounted on axles on the chassis 14, of which at least one wheel 22 is on each side of the chassis 14. According to FIGS. 1-5, there are preferably two wheels 22 on each side of the chassis 14 of the transfer trailer 10, i.e. the transfer trailer 10 then includes a set of bogies wheels 48, 50, which are shown in greater detail in FIGS. 2-4. Further, the transfer trailer includes brake means 28 and their operating device 36 for braking the transfer trailer 10. According to the invention, the brake means 28 include a brake surface 32, arranged to press directly on the base 200, a sensor 84 for measuring the control variable applied to control the speed of the transfer trailer 10, and control means 82 (shown in FIG. 6) connected to the sensor 84 for controlling the pressing of the brake surface 32 based on the measured control variable. In addition, the transfer trailer preferably includes coupling means 24 located on the first end 16 of the chassis 14, for coupling the transfer trailer 10 to the transfer vehicle 12 towing it.

The transfer trailer 10 preferably also includes tipping means 26 for tilting the chassis 14 and for transferring the work machine 100 on and off the chassis 14, as well as a brake surface 32 located on the undersurface 30 of the chassis 14 at the second end 18 of the chassis 14 in order to make contact with the base 200 to brake the transfer trailer 10. In other words, the chassis 14 is tipped preferably with the aid of the tipping means 26 while driving, so that at least the second end 18 of the chassis 14 makes contact with the base 200 by the brake surface 32, thus braking the movement of the transfer trailer 10. Braking with the brake surface 32 is preferably continuous for the whole duration of the transfer and only the pressure between the brake surface 32 and the base is controlled with the aid of the operating device 36. FIGS. 1, 2a, and 3-5 show a first embodiment of the transfer trailer according to the invention equipped with tipping means, whereas FIG. 2b shows a second possible embodiment, in which the brake surface is attached to a separate arm. In addition, it should be noted that FIGS. 2a and 3-5 show a simplified version of the transfer trailer according to the first embodiment, in which the hydraulic machinery 98 between the gooseneck, which appears in FIG. 1, is not drawn.

Figure 2A:
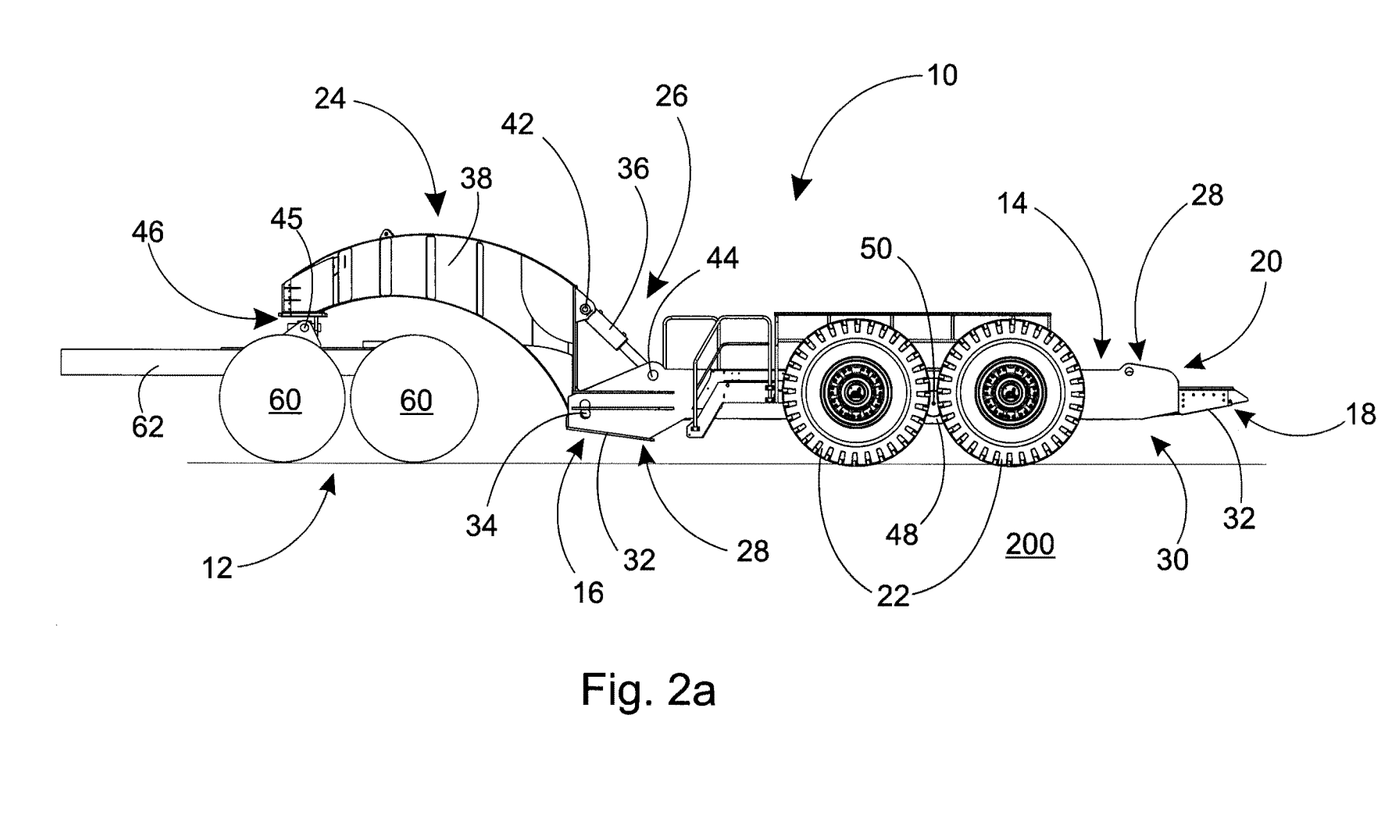
FIG. 2a shows a side view of the transfer trailer according to a first embodiment of the invention when empty, when the transfer trailer is being towed by the transfer vehicle on flat ground.
Figure 2B:
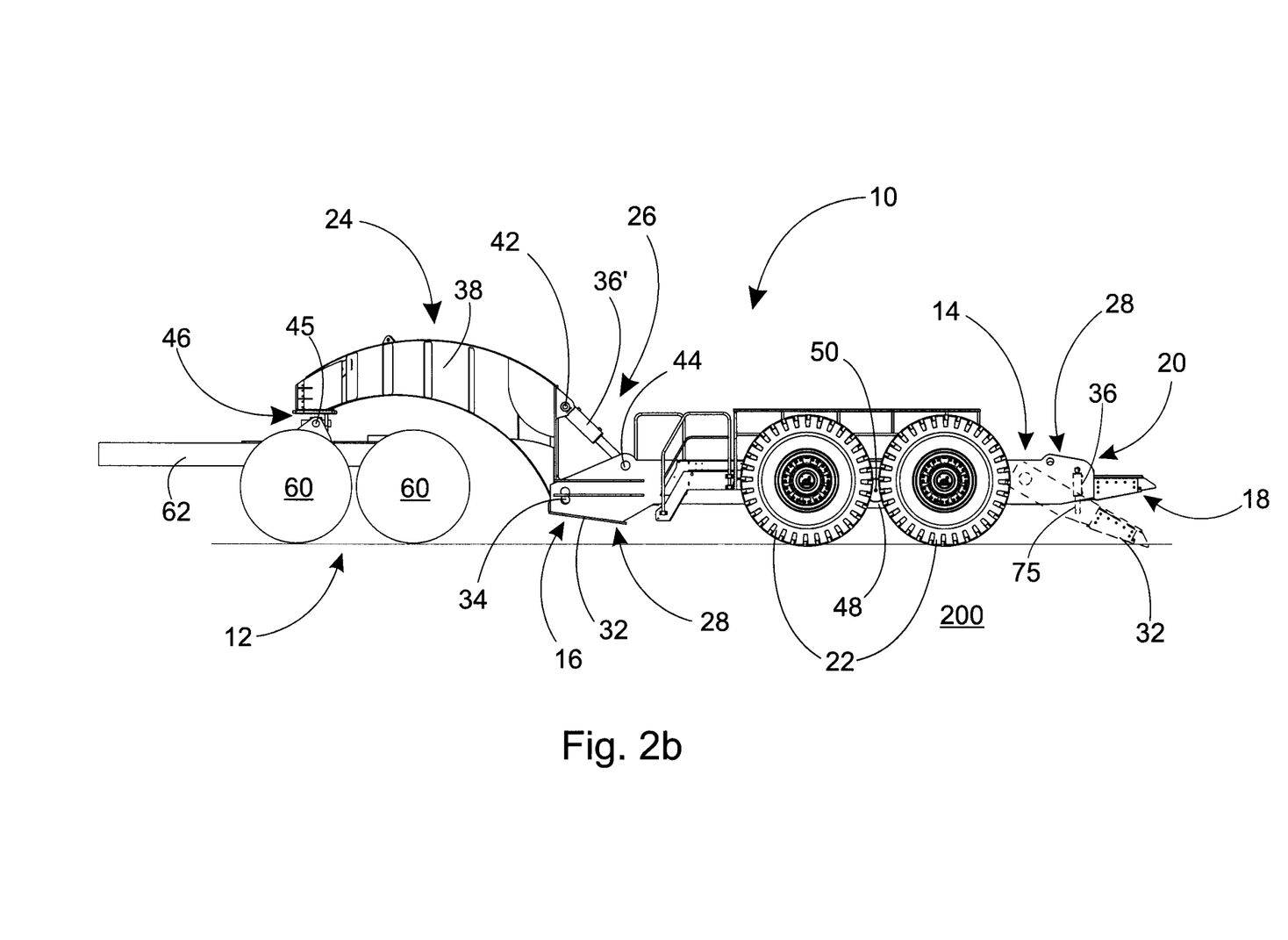
FIG. 2b shows a side view of a transfer trailer according to a second embodiment of the invention when empty, when the transfer trailer is being towed by the transfer vehicle on flat ground.

FIG. 2a shows in greater detail one preferred embodiment of the transfer trailer 10 according to the invention. FIG. 2a only shows part of the transfer vehicle 12 towing the transfer trailer 10, more specifically only the chassis 62 and rear wheels 60 of the transfer vehicle 12. The brake means 28 of the transfer trailer 10 preferably include replaceable and/or turnable brake surfaces 32, which are optimized for various conditions, wet, soft, and winter conditions on icy roads. At the second end of the chassis, there are preferably two brake surfaces that are separate from each other, each located under the ramps at the width of the crawler tracks of the work machine, at the extreme second end of the transfer trailer's chassis. At the first end, the brake surface can be one unified piece.

According to FIG. 2b, in the transfer trailer 10 of the second embodiment of the invention, braking can be performed with the aid of a brake surface 32 attached to the end of a separate arm 75. The arm 75 can be operated with the aid of an operating device 36 to press the brake surface 32 against the base 200. Such a construction can also be implemented at reasonable cost in existing carriage structures.

The brake means 28 also include a double-armed cylinder in the fifth wheel of the transfer vehicle 12, which guides the operating devices between the transfer trailer and the gooseneck 38 belonging to the coupling means 24 automatically according to which drive state has been selected. Drive states can be flat ground, downhill, and uphill. The drive states can be controlled from the control unit in the cab, belonging to the brake means. At the selected drive state, the transfer trailer operates automatically and in that case all that is in operation is the hydraulic system, which operates as an independent pressure-controlled system. Thus, safety is improved, because the possibility of faults is reduced. A fault in the control system automatically activates a stop, if the engine of the towing transfer vehicle shuts down or the system loses hydraulic pressure for some other reason.

There are the following stages in the transfer of a work machine in the method according to the invention. In the method, the slowing of the transfer trailer 10 takes place by pressing the brake surface 32 directly against the base 200, with the aid of the operating device 36. At the same time, at least one control variable relating to the control of the speed of the transfer trailer 10 is measured during the transfer and the pressing of the brake surface 32 is guided on the basis of the measurement data. In practice, the actual transfer using the transfer trailer according to the first embodiment of the invention takes place in such a way that first of all the chassis 14 of the transfer trailer 10 is rotated around the bogie axle 50 with the aid of the tipping means 26 until the end 16 of the chassis 14 is lowered onto the base. Next, the work machine 100 is driven on top of the chassis 14 of the transfer trailer 10 and the chassis 14 of the transfer trailer is rotated around the bogie axle 50 with the aid of the tipping means 26 until the end of the chassis 14 rises free of the ground. After this, the transfer trailer 10 is transferred by towing with the transfer vehicle 12 to the desired location and the speed of the transfer trailer 10 is slowed when necessary during the transfer by rotating the chassis 14 of the transfer trailer 10 around the bogie axle 50 with the aid of the tipping means 26 in order to bring the brake surface 32 at the end 16 of the chassis 14 into contact with the base. The brake surface 32 is preferably against the base 200 for the entire duration of the transfer and only the pressure between the brake surface 32 and the base 200 is altered according to the preselected control variable. The dragging of the brake surface 32 against the base reduces the speed of the transfer trailer. After the transfer, the chassis 14 of the transfer trailer 10 can be rotated around the bogie axle 50 with the aid of the tipping means 26 until the end 16 of the chassis 14 is lowered onto the base, i.e. for example the surface of the road or ground, and the work machine 100 is driven off from on top of the chassis 14 of the transfer trailer 10. If braking is continued for the entire transfer, a separate tipping stage will be unnecessary.

According to FIG. 3, the braking of the transfer trailer 10 when going downhill takes place as follows. The braking of the transfer trailer 10 can be performed entirely with the aid of the braking means of the transfer vehicle. The maximum braking effect of the transfer trailer can be switched on immediately the transfer trailer starts moving, and at the latest before the transfer trailer arrives at the hill, in which case the towing transfer vehicle does not have to brake but to pull. Such control of the braking is preferably used in slippery conditions, such as in rain or in winter when there is ice on the roads. Braking can also be used continuously, if the safety instructions forbid normal operation of the transfer trailer when going up and downhill. More specifically, the transfer trailer 10 is supported by its coupling counter-piece 46 on the corresponding coupling means of the transfer vehicle and by its wheels 22 on the base 200. The coupling counter-piece 46 includes a transverse and essentially horizontal pivot 45, around which the gooseneck 38 can rotate by about 10° during braking. When it is desired to brake the movement of the transfer trailer 10 in the transfer trailer according to the first embodiment of the invention, the operating device 36 between the gooseneck 38 and the chassis 14 is used, when the angle between the gooseneck 38 and the chassis 14 increases and the chassis 14 mounted on the wheels 22 rotates around the pivot 34 between the coupling means 24 and the chassis 14 by about 10°. If necessary, the angle can be greater, if the ground clearance of the transfer trailer is large. According to FIG. 3, the angle α between the gooseneck 38 and the chassis 14 can be, for example, 110° when braking downhill. In this connection, the term using the operating device refers to bringing the piston rod of the cylinder operating device outwards. The transfer trailer preferably gets the energy needed for braking from the transfer vehicle, but the transfer trailer can also include its own hydraulic pump, which takes its energy from the motion of the transfer trailer. However, the transfer trailer preferably includes separate pressure accumulators, in which a sufficient volume flow is stored at a sufficient pressure, which can be used for the emergency stopping of the transfer trailer if a fault develops in the transfer vehicle's hydraulics.

Figure 3:
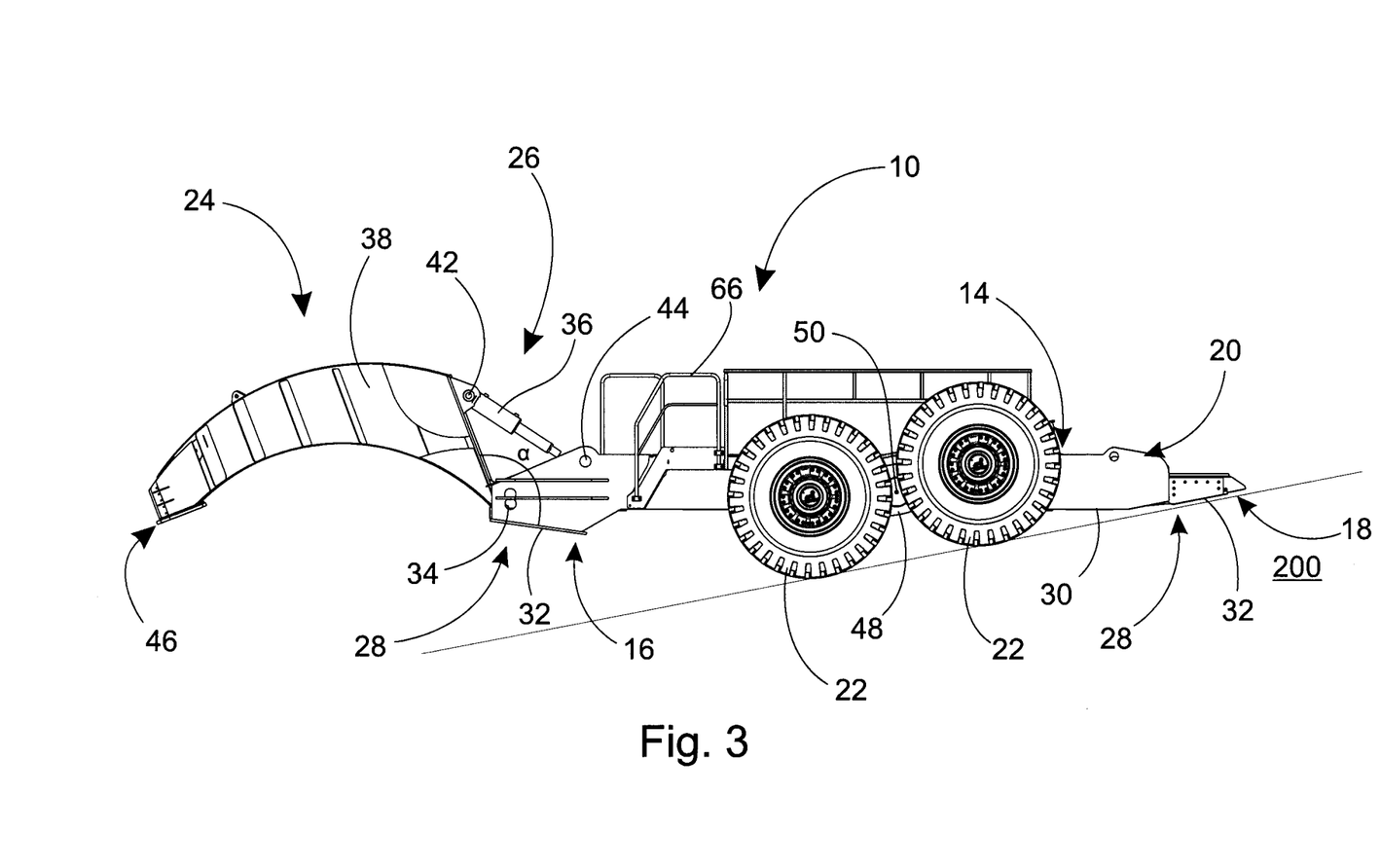
FIG. 3 shows a side view of the transfer trailer according to the first embodiment of the invention when empty, when the transfer trailer is being towed by the transfer vehicle going downhill and the transfer trailer is being braked.

In FIG. 3, the transfer trailer 10 includes a set of bogie wheels, in which there is a bogie frame 48, which is in turn pivoted with the aid of an axle 50 to the chassis 14. The wheels 22 are in turn pivoted to the bogie frame 48. The operating device 36 is preferably a hydraulic cylinder operating device, which is pivoted at one end with the aid of a pivot pin 42 to the gooseneck 38 and at the second end with the aid of a pivot pin 44 to the chassis 14. When the piston rod of the operating device 36 rises, the chassis 14 rotates around the axle 50, until the second end 18 of the chassis 14 of the transfer trailer 10 and the brake surface 32 in it come into contact with the base 200.

In transfers according to FIGS. 2a and 2b taking place on an essentially flat base, the braking effect of the transfer vehicle is sufficient for an eight percent downhill slope and this is then the principal braking method. However, in the method according to the invention, braking takes place preferably continuously, so that the transfer can be performed entirely without the brakes of the transfer vehicle. Alternatively, when the driver selects the downhill position on the control unit, the transfer trailer drops the brake surface nearly onto the base, so that if the automation detects the hydraulic pressure being lost in the towing transfer vehicle or the driver pressure the so-called emergency-stop button in the cab. For emergency situations, the transfer trailer's hydraulic system can be equipped with pressure accumulators, which, during normal operation, store enough energy to make a complete application of the brakes without pressure in the actual hydraulic system.

Figure 4:
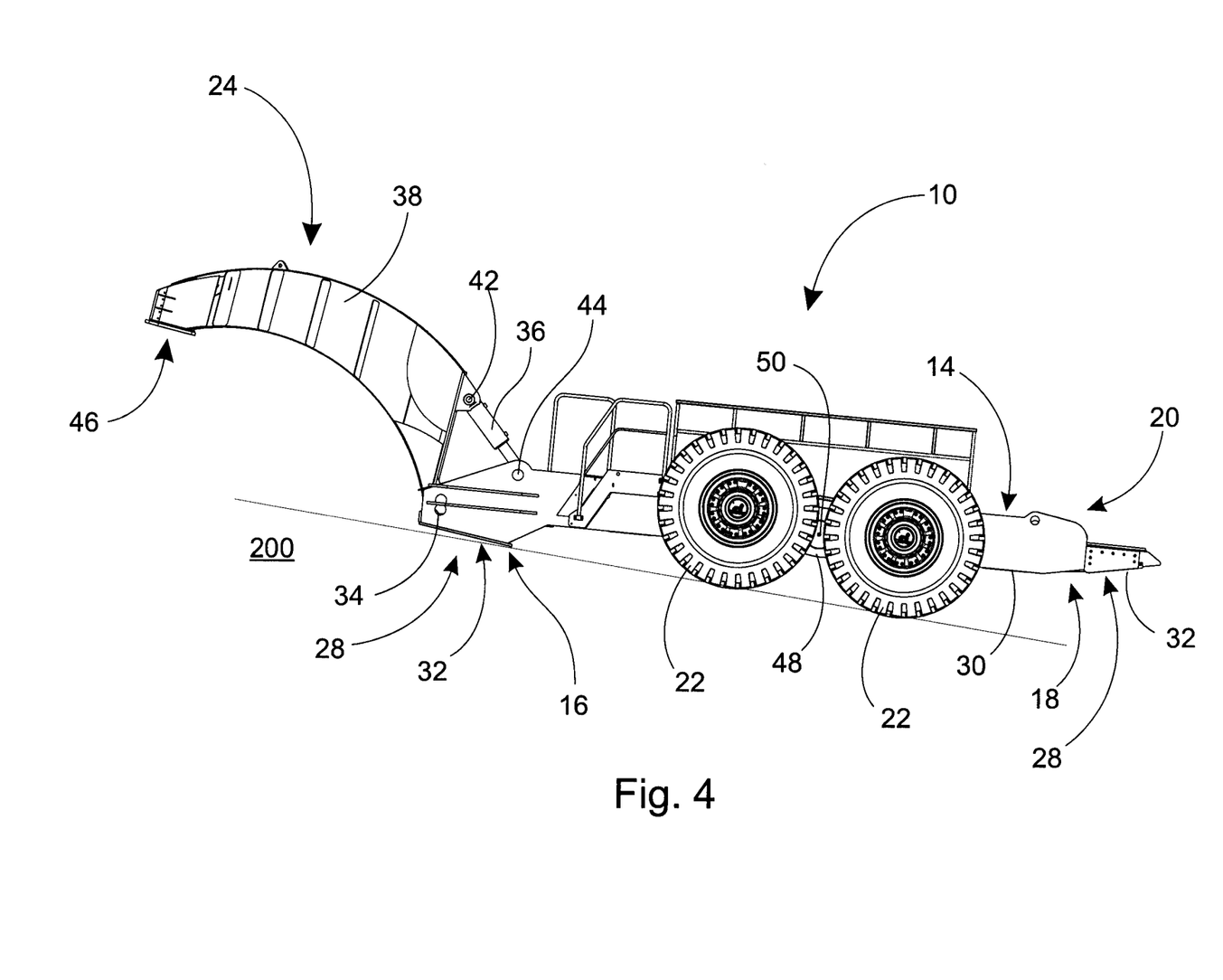
FIG. 4 shows a side view of the transfer trailer according to the first embodiment of the invention when empty, when the transfer trailer is being towed by the transfer vehicle going uphill and the transfer trailer is being braked.

According to FIG. 4, when going uphill and braking the first end 16 of the chassis 14 of the transfer trailer 10 is lowered onto the base, when the driver presses the emergency-stop button. More specifically, when braking uphill the piston rod of the cylinder operating device preferably acting as the operating device 36 of the tipping means 26 is pulled inwards, when the angle between the gooseneck 38 and the chassis 14 is reduced in the transfer trailer 10 according to the first embodiment of the invention. At the same time, the chassis 14 rotates around the axle 50, so that the first end 16 of the chassis 14 comes into contact with the base 200 with the aid of its brake surface 32.

Figure 5:
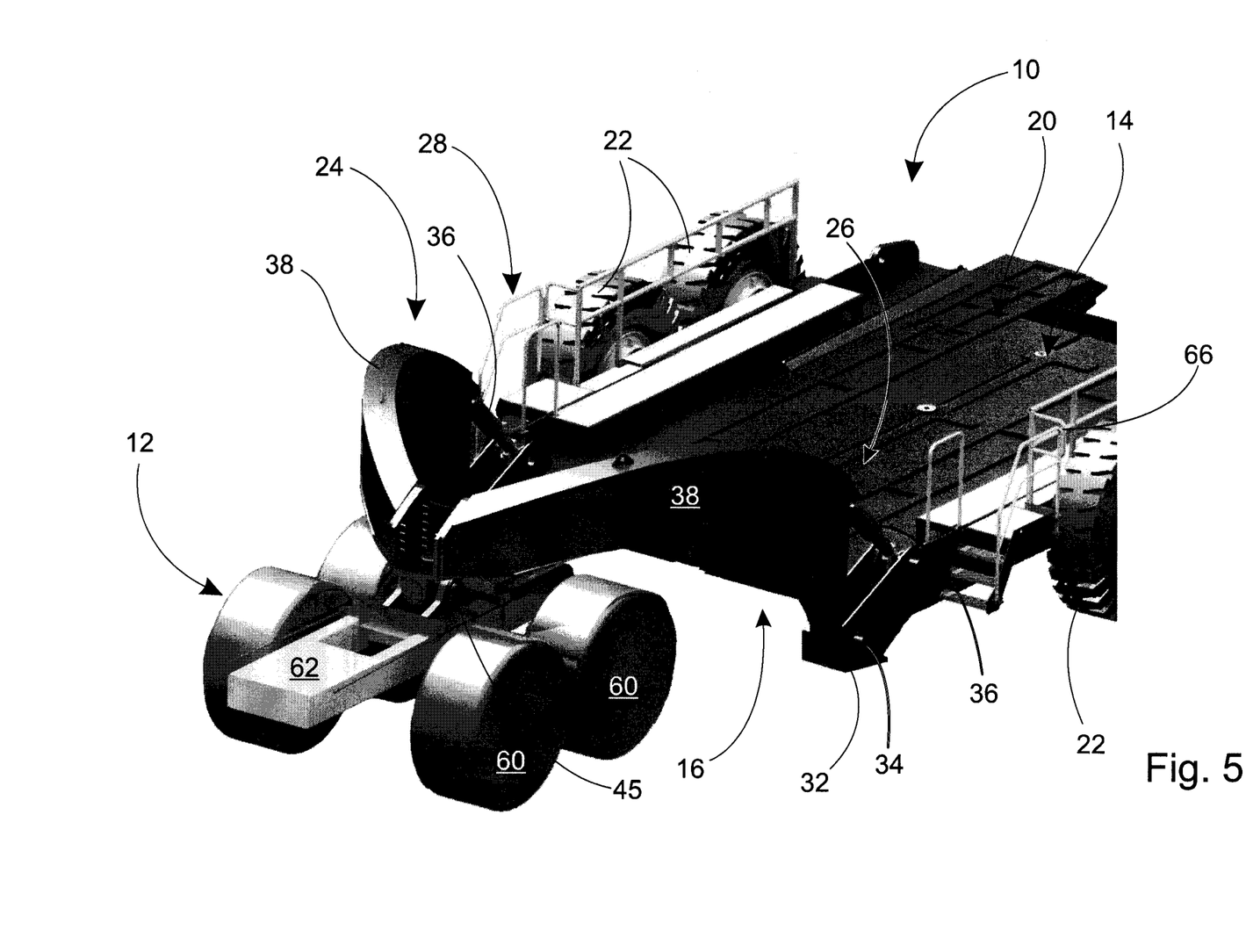
FIG. 5 shows an axonometric view of the transfer trailer according to the first embodiment of the invention when empty, when the transfer trailer is being towed by the transfer vehicle.

FIG. 5 shows an axonometric view of the transfer trailer according to the first embodiment of the invention. According to FIG. 5, the coupling means 24 preferably include two goosenecks 38, which ensures the sturdiness of the coupling means 24. Attachment means and their counter-pieces known from the prior art can be used to attach the gooseneck 38 to the transfer vehicle. The transfer trailer 10 can also include walkways 66, over which the driver of the work machine can easily leave the work machine for the duration of the transfer, according to safety regulations. According to FIG. 5, the support surface 20 can be a unified surface, or it can also be formed of only ramps for the chassis, i.e. the crawler tracks or wheels of the work machine, in which case the space between the ramps will be open.

In the transfer trailer according to the invention it is important that the work machine can be secured firmly to the transfer trailer, as the chassis can tilt during transfer when the work machine is being carried by the transfer trailer. Generally, heavy pieces to be transferred are secured with chains and tightened using tensioning clamping stirrups. A problem with these is a securing capacity of only 20 tonnes and the labourious securing work due to the chains' weight and the operation of the clamping stirrups. These also cause work-safety risks during handling. In normal transfers, if the work machine being transported is in good condition, the work machine's crawler tracks brakes keep the work machine well in place during the transfer. It is always important to carrying out securing if there is no certainty of the operation of the work machine's brakes.

Wear components that can be easily changed are preferably used as the brake surfaces of the transfer trailer according to the invention. One example is Metso Nordberg C-series jaw crushers, which use replaceable wear components. In this case, the wear component can be dimensioned to be thinner, because there is no impact stress. The brake surfaces (wear components) can have quick-release attachments. Depending on their use, the brake surfaces can be smooth, grooved, or studded (winter use).

Braking power is preferably controlled by pressing, i.e. guiding the pressure on the brake surface. Control is based on the guidance of the measured pushing/pulling with the aid of pressure, in such a way that the pushing/pulling remains within the selected range. According to FIG. 1, in connection with the pivot 45 acting as a pulling pivot, there is preferably a suitable sensor 84. Control can also be based, for example, on the guidance of the speed sensor 84', in which the speed sensor is preferably located in connection with a freely rotating brakeless wheel. Thus, reliable information on speed is always obtained for the speed measurement, even though, for example, the wheels of the transfer vehicle would be locked on a slippery surface. The brake means preferably include, in addition, a pressure accumulator. If the engine power of the transfer vehicle is lost, the necessary power is available from the pressure accumulator.

According to one embodiment, the chassis on the axle line of the bogie includes a strain gauge, which can be used to weigh the load of the transfer trailer. In this way, the transfer trailer can be weighed without separate weighing.

The driver is a risk factor in the transportation of heavy machines. The transfer trailer according to the invention can preferably be supervised with the aid of GPS positioning, i.e. it is possible to use so-called centralized monitoring. The automation can be arranged to stop the transfer, if the transfer trailer is in the wrong attitude or has some other problem.

The transfer trailer according to the invention can also be implemented with the aid of a single brake surface, in which case the brake surface is located at the second end of the chassis of the transfer trailer. Thus, the brake surface can be used to brake the transfer trailer when going downhill. In that case, braking when going uphill must be performed using some other means. However, brake surfaces are preferably used in the transfer trailer at both ends of the chassis, which increases the usability of the transfer trailer.

According to FIGS. 2a-4, the brake surface 32 is preferably at a slanting angle relative to the undersurface 30 of the chassis 14. The purpose of this feature is to ensure that the pressure against the base 200 is directed essentially to the whole surface area of the brake surface 32 and not just to the edges of the brake surface. This, in turn, increases the power of the brake and reduces one-sided wear of the brake surface.

In the transfer trailer according to the first embodiment of the invention, the braking movement made by the chassis when going downhill is essentially the same as the movement that the chassis makes when it is tipped. In this connection, the term tipping refers to the second end of the chassis being lowered to the base in order to load a work machine onto the transfer trailer. According to one embodiment, with the aid of braking ploughing/levelling of the road can be performed at the same time, so that the road remains in good condition the whole time.

Figure 6:
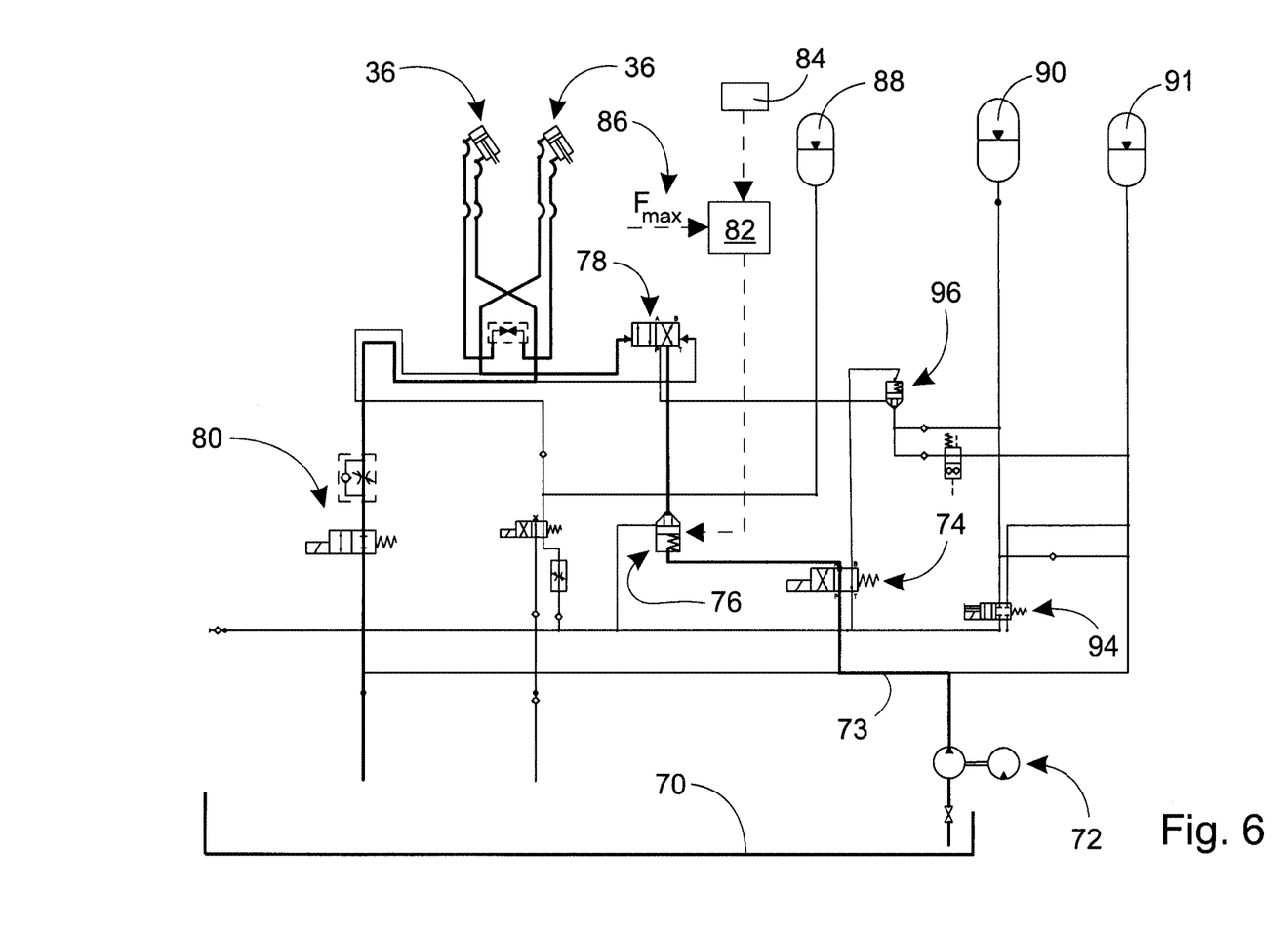
FIG. 6 shows a schematic diagram of the combined hydraulic and electrical circuits of the transfer trailer.

FIG. 6 shows the hydraulic diagram of the transfer trailer according to the invention together with the control circuit in a simplified form in the same figure. According to FIG. 6, the control variable of the transfer of the transfer trailer, most advantageously the tractive force between the transfer trailer and the towing vehicle, is measured with the aid of a sensor 84. The tractive force can be measured, for example, with the aid of strain-gauge measurement. The measurement data of the control variable is led, for example over a CAN bus, to the control means 82, to which a preselected limit value 86, for example the maximum value of the tractive force, of the control variable is also entered. On the basis of a comparison of the measured value of the control variable and the limit value the control means 82 guide preferably a proportional valve 76, which is connected to the hydraulic line of the operating device or devices 36. The control means 82 is preferably an electrical control device, which automatically guides the proportional valve 76, by means of which it is possible to control the magnitude of the flow steplessly. Control means located, for example, in the transfer vehicle, which the operator uses manually to control the operation of the proportional valve on the basis of the measurement data and preselected limit value of the control variable, can also be used as control means 82.

The hydraulic oil is led from the reservoir 70 with the aid of pump 72 along the main line 73 to the directional valve 74, which guides the flow to the proportional valve. The proportional valve 76 allows the hydraulic-oil flow according to the control of the control means 82 to the second directional valve 78, which in turn guides the flow to the work side of the cylinders acting as an operating device or devices in order to press the brake surface 32 against the base. From the operating devices 36, the hydraulic flow returns through throttling and the valve 80 to reservoir 70.

FIG. 6 also shows the emergency-stop hydraulic circuit of the transfer trailer. This includes a first pressure accumulator 90, which contains a sufficient volume flow of compressed hydraulic oil. When an emergency stop takes place, the compressed hydraulic oil is led from the pressure accumulator 90 through a second proportional valve 96 to a second directional valve 78 and through it to the operating devices 36 to press the brake surface with full force against the base. The transfer trailer preferably also includes an operating circuit pressure accumulator 91, which contains a sufficient volume flow of compressed hydraulic oil, so that the output of the pump can be smaller. In addition, the transfer trailer includes a valve operating-pressure pressure accumulator 88, with the aid of which sufficient pressure is ensured for the operation of the hydraulics in all circumstances. Reference number 94 refers to a directional valve, which controls the flow of hydraulic oil to the reservoir.

Returning to FIG. 1, the components of the hydraulic machinery 98 described above, such as the pump, reservoir, and pressure accumulators, as well as most of the electrical transfer trailer control, are located on a separate frame in the middle of the gooseneck that branches into two. Here, the hydraulic and electrical components are protected from impacts and can be easily detached as an entirety for maintenance.

Figure 7A:
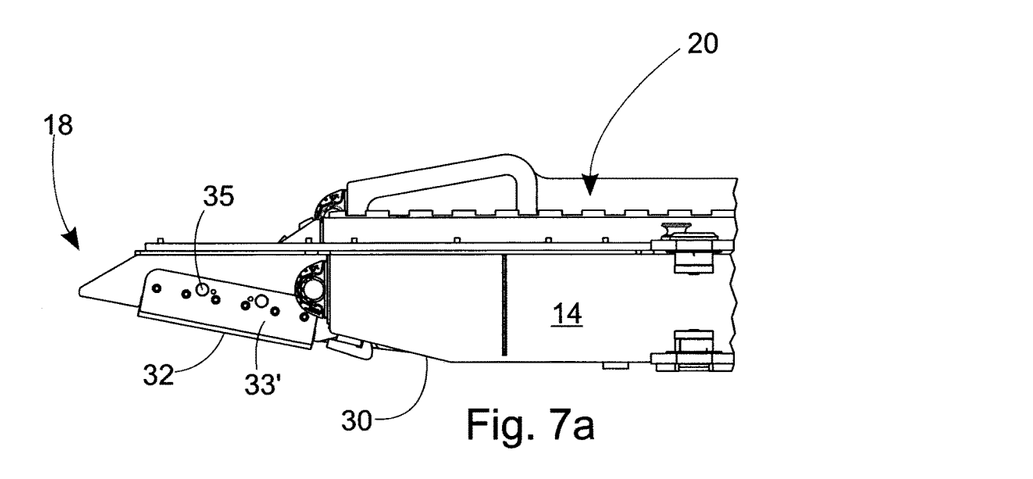
FIGS. 7a-7c show different projections of the brake surface.
Figure 7B:
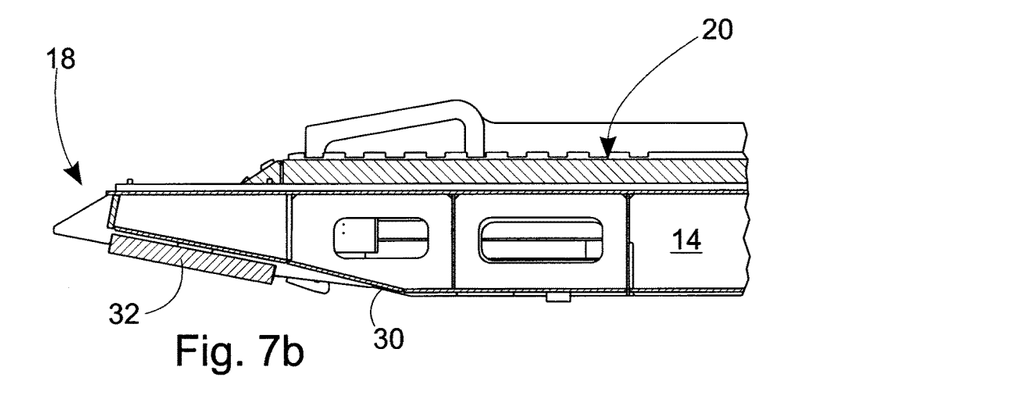
Figure 7C:
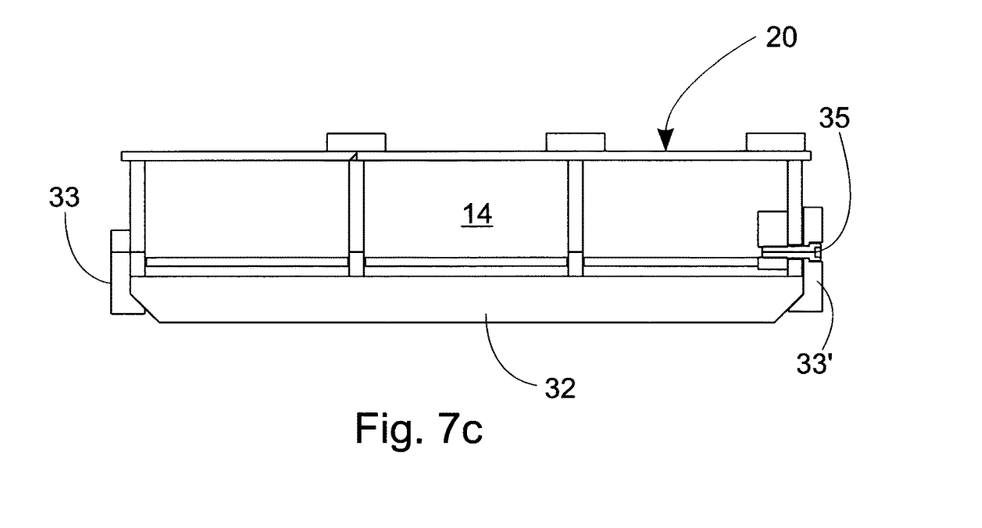

FIGS. 7a-7c show the brake surface 32 belonging to the brake means in greater detail attached to the chassis 14. In FIG. 7a, the brake surface 32 is shown seen straight from the side. In this embodiment, the brake surface 32 is attached to the second end 18 of the chassis 14 to the undersurface 30 of the chassis 14. FIG. 7b shows the same attachment in a cross-section in the longitudinal direction of the chassis 14. The brake pad 32 can be a planar plate, which is attached to the chassis 14 with the aid of end attachments 33 and 33' shown more clearly in FIG. 7c. One of the end attachments 33 is preferably a permanent part of the chassis 14, whereas the second end attachment 33' is detachably attached with the aid of bolts 35. With the aid of the detachable end attachment 33', it is simple to detach the brake pad 32. The brake surface 32 can be changed, for example, due to wear or changed operating conditions.

The method according to the invention has in common with the methods of the prior art the fact that the work machine is transported on the transfer trailer at the same time measuring the transfer speed of the transfer trailer and limiting it by braking. In the case of the characteristic parts of the method it is surprising that during the transfer braking takes place directly towards the base of the transfer trailer.

The invention claimed is:

1. A method for safely towing a transfer trailer that is used to transfer heavy work machines on a sloping base, the transfer trailer having a chassis with axles and wheels mounted on the axles, the method comprising the steps of:
   towing the transfer trailer with aid of a transfer vehicle that continuously applies a tractive force between the transfer trailer and the transfer vehicle,
   providing the transfer trailer with a brake mounted on the chassis and an operating device, the brake having a brake surface operable to press directly on the base for continuous dragging against the base causing friction between the transfer trailer and the base, the brake surface being a wear component,
   operating the operating device to apply pressure to the brake surface and press the brake surface directly on the base continuously dragging the brake surface against the base during an entire duration of the transfer throughout the towing preventing an uncontrolled rise in the speed of the transfer trailer when being towed with the transfer vehicle,
   measuring at least one control variable relating to the control of the speed of the transfer trailer during the braking and obtaining measurement data, and
   controlling the pressing of the brake surface on the basis of the measurement data in order to control the speed of the transfer trailer.

2. The method according to claim 1, wherein the control variable is at least one of transfer speed of the transfer trailer and the tractive force between the transfer trailer and the transfer vehicle.

3. The method according to claim 2, wherein the control variable is the tractive force between the transfer trailer and the transfer vehicle, and a lower limit value of the tractive force is arranged to be greater than only traction caused by weight of the transfer trailer.

4. The method according to claim 1, wherein all slowing of the speed of the transfer trailer during transfer takes place with the aid of the brake surface.

5. The method according to claim 1, including the step of manually controlling the pressing of the brake surface with the aid of a control-variable indicator shown to an operator.

6. The method according to claim 1, including the step of using the operating device to operate a tipping means for rotating the chassis of the transfer trailer around a bogie axle in order to control the strength of contact between the brake surface at an end of the chassis and the base, in order to slow the speed of the transfer trailer.

7. The method according to claim 1, including the step of setting a limit value for at least one control variable, on the basis of which the operating device is guided automatically for pressing the brake surface of the transfer trailer with the aid of a control.

8. A transfer trailer for transferring a heavy transferable work machine on a base, the transfer trailer arranged to be towed by a transfer vehicle, the transfer trailer comprising:
a chassis including a first end and a support surface carried by the chassis for supporting a transferable work machine on the transfer trailer,
an axle on the chassis and at least two wheels mounted on the axle, one on each side of the chassis,
a brake mounted on the chassis and a hydraulic cylinder as an operating device for slowing the speed of the transfer trailer on a sloping base,
said brake including:
a brake surface being a wear component pressing directly on the base for continuous dragging against the base during an entire duration of the transfer throughout the towing,
a sensor for measuring a control variable relating to controlling the speed of the transfer trailer,
a proportional valve to control the magnitude of hydraulic flow to the hydraulic cylinder steplessly, and
a control connected to the sensor to control the operation of the proportional valve for controlling the pressing of the brake surface against the base according to the measured control variable to control friction between the transfer trailer and the base to transfer the transfer trailer steplessly preventing an uncontrolled rise in the speed of the transfer trailer when being towed by the transfer vehicle.

9. The transfer trailer according to claim 8, comprising tipping means for tilting the chassis in order to move the transferable work machine on and off the chassis and for pressing the brake surface onto the base, in order to brake the transfer trailer during the tilting of the chassis.

10. The transfer trailer according to claim 9, wherein the operating device for pressing the brake surface defines in part the tipping means for tilting the chassis.

11. The transfer trailer according to claim 8, wherein the transfer trailer includes a coupler located at the first end of the chassis for coupling the transfer trailer to a transfer vehicle.

12. The transfer trailer according to claim 11, wherein the coupler includes a transverse pivot to allow the coupler to pivot relative to the first end of the chassis.

13. The transfer trailer according to claim 11, wherein the operating device is disposed between the coupler and the chassis.

14. The transfer trailer according to claim 11, wherein the coupler includes a gooseneck branching outwardly from a coupling counter-piece toward both sides of a towing head of the chassis and a transverse pivot at the towing head of the chassis.

15. The transfer trailer according to claims 8, wherein the chassis includes an undersurface and a brake surface on the undersurface at both ends of the chassis.

16. The transfer trailer according to claim 15, wherein the transfer trailer includes a separate arm pivoted to the undersurface of the chassis, one end of the arm attaching the brake surface, and the operating device being pivoted between the arm and the chassis.

17. The transfer trailer according to claim 8, wherein the transfer trailer includes a lock for locking the work machine on top of the chassis, the lock including fibre-reinforced securing ropes and at least one locking operating device for tightening the securing ropes.

18. The transfer trailer according to claim 8, wherein the mass of the work machine to be transferred using the transfer trailer is more than 50 tonnes.

19. The transfer trailer according to claim 8, wherein the control is arranged to guide tilting of the chassis automatically, in order to create a braking effect.

20. The transfer trailer according to claim 8, wherein the transfer trailer includes at least two mutually interchangeable brake surfaces having different coefficients of friction.

* * * * *